United States Patent [19]
Cao

[11] Patent Number: 6,104,515
[45] Date of Patent: Aug. 15, 2000

[54] METHOD AND APPARATUS FOR PROVIDING HIGH-ORDER POLARIZATION MODE DISPERSION COMPENSATION USING TEMPORAL IMAGING

[75] Inventor: Xiang-Dong Cao, Boynton Beach, Fla.

[73] Assignee: Otera Corporation, Boca Raton, Fla.

[21] Appl. No.: 09/243,369

[22] Filed: Feb. 1, 1999

[51] Int. Cl.[7] .................................................. H04B 10/00
[52] U.S. Cl. .......................... 359/161; 359/158; 359/177; 359/183
[58] Field of Search ..................................... 359/161, 158, 359/177, 183

[56] References Cited

U.S. PATENT DOCUMENTS

| | | | |
|---|---|---|---|
| 5,822,100 | 10/1998 | Robinson et al. | 359/161 |
| 5,859,939 | 1/1999 | Fee et al. | 385/24 |
| 5,930,414 | 10/1998 | Fishman et al. | 385/11 |

OTHER PUBLICATIONS

Article entitled "Polarization Mode Dispersion: Fundamentals and Impact on Optical Communication Systems" by F. Heismann, *European Confeence on Optical Communication* (ECOC'98), vol. 2, pp. 51–79, 1998.

Article entitled "Finer–Based Distributed PMD Compensation at 20 GB/S" by R. Noe et al., 1993, *European Conference on Optical Communication* (ECOC'98), vol. 3, pp. 157–159, 1998.

Article entitled "Electronic Equalization of Fiber PMD–Induced distortion at 10 Gbit/s" by H. Bullow et al., *Optical Fiber Commuication Technical Digest* (OFC'98), pp. 151–152, 1998.

Article entitled "Polarization Mode Dispersion Compensation by Phase Diversity Detection" by B. W. Hakki, *IEEE Photonics Technology Letters*, vol. 9, No. 1, pp. 121–123, Jan. 1997.

*Primary Examiner*—Leslie Pascal
*Assistant Examiner*—Hanh Phan

[57] ABSTRACT

A high-order polarization mode dispersion (PMD) compensation arrangement compensates for PMD in an optical signal using a temporal imaging technique. An optical data input signal to the PMD compensator arrangement includes first and second polarization components for each bit of data that have been subjected to PMD. In the PMD compensation arrangement a clock recovery arrangement generates an electrical clock output control signal including a predetermined phase modulation depth and phase and a data rate of the received optical input data signal. A phase modulator is responsive to the optical input data signal and the electrical clock output control signal from the clock recovery arrangement for generating an optical output signal. In this optical output signal, the phase of the first and second polarization components associated with each data bit are delayed by a predetermined amount. A dispersive unit introduces a predetermined amount of dispersion to the first and second polarization components in the optical output signal from the phase modulator for generating an output optical signal from the PMD compensation arrangement wherein the first and second polarization components for each data bit are in phase.

22 Claims, 5 Drawing Sheets

METHOD AND APPARATUS FOR PROVIDING HIGH-ORDER POLARIZATION MODE DISPERSION COMPENSATION USING TEMPORAL IMAGING

FIELD OF THE INVENTION

The present invention relates to method and apparatus for providing high-order polarization mode dispersion compensation in high-speed optical transmission networks and systems using temporal imaging techniques.

BACKGROUND OF THE INVENTION

Polarization mode dispersion (PMD) has become one of the most important limiting factors for high-speed optical communication systems, especially for existing optical networks. The existing optical fiber networks have poor PMD characteristics with the PMD ranging from 0.5 to 2 ps/km$^{1/2}$, corresponding to transmission distances of 400 km down to 25 km for 10 Gbit/s systems. As optical networks evolve, it is highly desirable to transport data over long distance. For example, long distance transmission is crucial for four-fiber bidirectional line switched rings (BLSRS) since the protection path can be as long as the whole optical ring. Therefore, PMD compensation has become an urgent issue for high-speed optical communication systems. Although new fiber networks have better PMD performance and can support 10 Gbit/s transmission over reasonably long distance, PMD will become a limiting factor for 40 Gbit/s transmissions. As the capacity demands keep increasing, it is desirable to increase the bit-rate from 10 Gbit/s to 40 Gbit/s. Therefore, PMD compensation is very important not only for existing optical fiber networks, but also for the new optical fiber networks. However, unlike chromatic dispersion, PMD is statistical in nature, which makes it extremely challenging to compensate for waveform distortion caused by PMD.

For a laser source with narrow bandwidth, there will be two polarization modes for a single mode fiber. There is a group delay between these two eigen-modes, also known as the principal states of polarization (PSP). If the input polarization is aligned with one of the PSPs, then the output polarization will remain in the same PSP. In other words, there will be no waveform distortion if the input polarization is lined up with one of the PSPs. However, for arbitrary input polarizations, the output will consist of both PSPs with a certain amount of group delay between them. It is this differential group delay (DGD) that causes waveform distortion. In order to compensate for PMD, it is necessary to find the PSPs at the output so that a polarization splitter can be used to separate the two PSPS.

Three categories of techniques are used for PMD compensations. They are: (a) all-optical, (b) all electrical, and (c) hybrid. For all-optical PMD compensation, the restoration of PMD distortion is done optically without any optical-electrical conversion. The signal remains in the optical domain. Normally, all-optical PMD compensators consist of a polarization controller, a pair of polarization beam splitters (PBSs), and either a continuous delay line or a discrete delay line such as a piece of high-birefringence optical fiber. The basic concept is to find the PSPs and align their axes to those of the PBSs. A PMD detection mechanism is then used to measure the Differential Group Delay (DGD) as the feedback signal, which is used to adjust the delay line so that the DGD is reduced to minimum. There are several different ways of measuring DGD.

In the article entitled "Polarization Mode Dispersion: Fundamentals and Impact on Optical Communication Systems" by F. Heismann, European Conference of Optical Communication (ECOC'98), Vol. 2, pages 51–79, (1998), high-speed electronics are used to measure the electrical spectrum content at specific frequencies, and then the spectral information is correlated with the DGD value. In the article entitled "Fiber-Based Distributed PMD Compensation at 20 GB/S" by R. Neo et al., European Conference of Optical Communication (ECOC'98), Vol. 3, pages 157–159, (1998), there is disclosed 77 ps Polarization Mode Dispersion (PMD) compensation for a transmission system at a speed of 20 Gbit/s using an improved RF spectrum analysis. In the article entitled "Electronic equalization of fiber PMD-induced distortion at 10 Gbit/s" by H. Bulow et al, Optical Fiber Communication (OFC'98), pages 151–152, (1998), there is demonstrated that 90 ps DGD can be compensated for by using an all-electrical method for a 10 Gbit/s system. In the all-electrical method, the distorted optical signal is converted to electrical signal at the receiver. A delay line filter with specific weights is used to partially compensate for the distortion due to PMD.

Hybrid PMD compensation is a technique that uses both optical and electrical methods to restore the distortion due to PMD. In the article entitled "Polarization Mode Dispersion Compensation by Phase Diversity Detection" by B. W. Hakki, IEEE Photonics Technology Letters, Vol. 9, No. 1, pages 121–123, January 1997, a hybrid PMD compensation technique is disclosed wherein a polarization controller (PC) and a polarization beam splitter (PBS) are used to transform the states of polarization, and split the polarization components. At each output of the PBS, a high-speed photo-detector converts the optical signal to electrical signal. An electrical delay line is used to adjust the phase delay between the two electrical signals.

There are both advantages and disadvantages for each of above mentioned techniques. For the all-optical PMD measurement technique, the usage of an optical delay line, as well as the usually complicated optical PMD measurement result in high insertion loss, and more importantly, slow compensation speed. On the other hand, the usage of a mechanical delay line raises a question of reliability. The requirement of a PMD measurement makes the compensation process relatively slow. The statistical nature of PMD also makes a high accuracy PMD measurement very difficult. On the other hand, the physical size requirement does not allow the usage of a fully featured PMD measuring device.

The electronic PMD measurement technique, using RF spectral information, suffers from laser chirp induced RF spectrum distortion, as well as distortion induced by optical fiber nonlinearity. As for all-electrical method, the finite number of delay lines makes this kind of PMD compensator good only for some specific values of Differential Group Delay (DGD). The compensation is normally partial. It evolves a high-speed electronics design, which complicates the functionality of receiver. The hybrid method also requires expensive high-speed electronics, as well as a pair of high-speed optical detectors. Both electronic and hybrid solutions are bit-rate dependent, as well as transmission format dependent.

It is desirable to provide a high-order polarization mode dispersion (PMD) compensation arrangement which (a) obviates the need for PMD measurement and endless polarization tracking, (b) is cost effective with high speed and low loss, (c) has no moving parts and has a compact size, and (d) uses a control signal that is independent of the dynamic PMD value while providing automatic high order PMD compensation.

SUMMARY OF THE INVENTION

The present invention is directed to method and apparatus for providing high-order polarization mode dispersion compensation in high-speed optical networks and systems which uses a novel technique called temporal imaging that avoids the need for complicated signal processing.

Viewed from one aspect, the present invention is directed to a high-order polarization mode dispersion (PMD) compensation arrangement for receiving an optical input data signal comprising first and second polarization components for each bit of data that have been subjected to PMD. The PMD compensation arrangement comprises a clock recovery arrangement, a phase modulator, and a dispersive unit. The clock recovery arrangement generates an electrical clock output control signal including a predetermined phase modulation depth and phase and a data rate of the received optical input data signal. The phase modulator is responsive to the optical input data signal received by the PMD compensation arrangement and the electrical clock output control signal from the clock recovery arrangement for generating an optical output signal wherein the phase of the first and second polarization components associated with each data bit are delayed by a predetermined amount. The dispersive unit introduces a predetermined amount of dispersion to the first and second polarization components in the optical output signal from the phase modulator and generates an output optical signal from the PMD compensation arrangement wherein the first and second polarization components for each data bit are in phase.

Viewed from another aspect, the present invention is directed to a high-order polarization mode dispersion (PMD) compensation arrangement for receiving an optical input data signal comprising first and second polarization components for each bit of data that have been subjected to polarization mode dispersion (PMD). The PMD compensation arrangement comprises a clock recovery arrangement, a phase modulator, and a dispersive unit. The clock recovery arrangement receives the optical input data signal, and generates therefrom an electrical clock output control signal comprising both a frequency corresponding to a bit data rate of the optical input data signal and a predetermined phase modulation depth and phase. The phase modulator receives the optical input data signal, and modulates the phase thereof in accordance with the electrical clock output control signal from the clock recovery arrangement including a phase difference of 90 degrees from that of the optical input data signal. The phase modulator generates an optical output signal wherein the phase of the first and second polarization components associated with each data bit are delayed by a predetermined amount. The dispersive unit introduces a predetermined amount of dispersion to the first and second polarization components in the optical output signal from the phase modulator and generates an output optical signal from the PMD compensation arrangement wherein the first and second polarization components for each data bit are in phase.

Viewed from still another aspect, the present invention is directed to a method of providing high-order polarization mode dispersion (PMD) compensation in an optical transmission system. In a first step, an optical signal is received including first and second orthogonal principal states of polarization (PSPs) that have been subjected to PMD. In a second step, an electrical clock output control signal is generated comprising both a frequency corresponding to a bit data rate of the optical input data signal and a predetermined phase modulation depth and phase in a clock recovery arrangement from the received optical input data signal. In a third step, the phase of the optical input data signal received in the first step is modulated in a phase modulator in accordance with the electrical clock output control signal generated in the second step. The electrical clock control signal has a 90 degree phase difference from that of the optical input data signal. The phase modulator generates an optical output signal wherein the phase of the first and second polarization components associated with each data bit are delayed by a predetermined amount. In a fourth step, a predetermined amount of dispersion is introduced to the first and second polarization components in the optical output signal from the phase modulator by a dispersive unit for generating an output optical signal from the PMD compensation arrangement wherein the first and second polarization components for each data bit are in phase.

The invention will be better understood from the following more detailed description taken with the accompanying drawings and claims.

DETAILED DESCRIPTION

Figure 1:
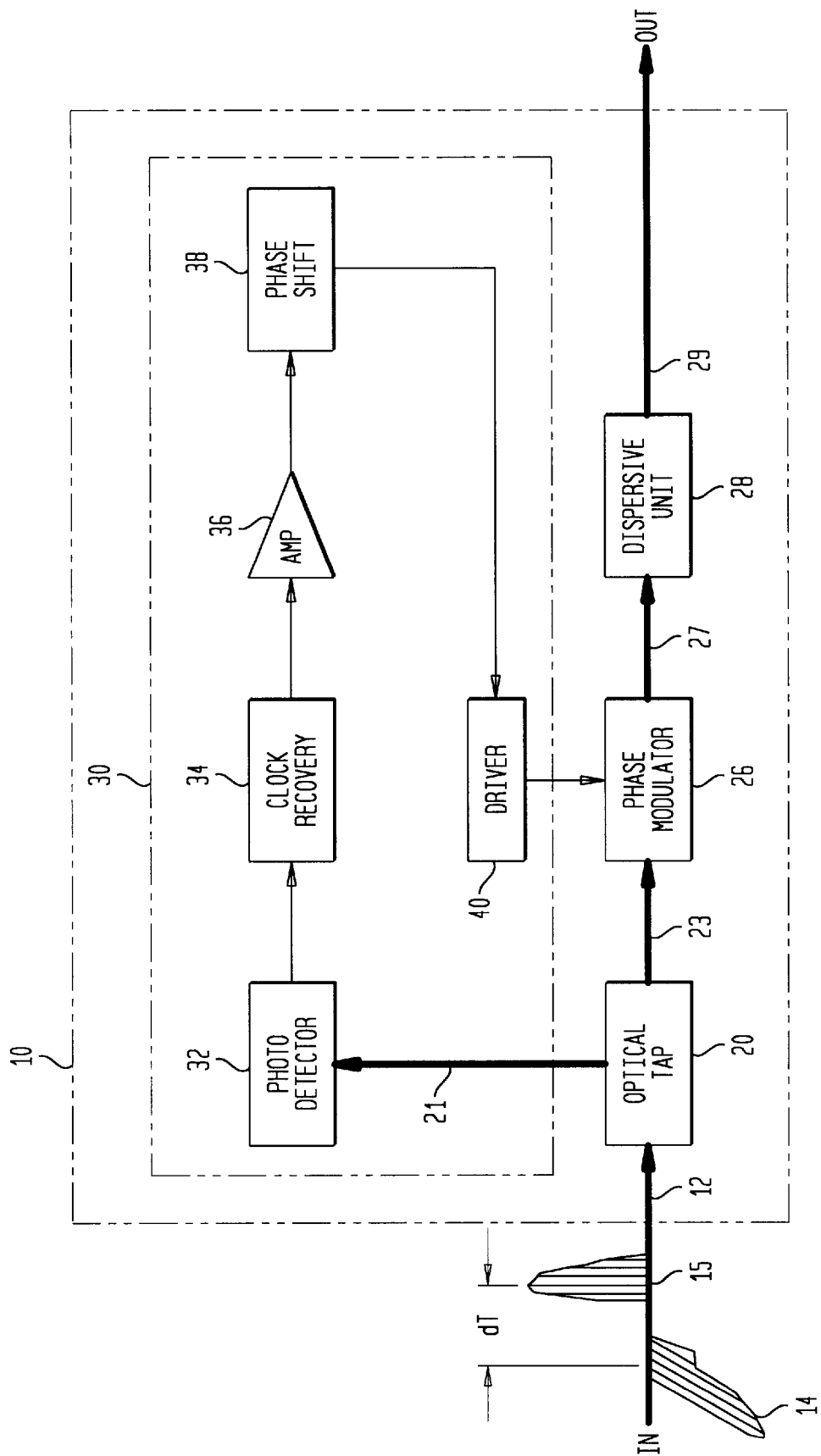
FIG. 1 shows a block diagram of a polarization mode dispersion (PMD) compensation arrangement using temporal imaging in an optical transmission system in accordance with the present invention.

Referring now to FIG. 1, there is shown within a dashed line rectangle a block diagram of a polarization mode dispersion (PMD) compensation arrangement 10 using temporal imaging in an optical transmission system in accordance with the present invention. The PMD compensation arrangement 10 comprises an optical tap 20, a polarization-independent phase modulator 26, a dispersive unit 28, and a clock recovery unit 30 (shown within a dashed line rectangle). The optical tap 20 is coupled to receive an optical data signal from a remote transmitter (not shown) via a single mode optical fiber 12. The optical tap 20 is coupled to direct a first portion of the received optical signal to an input of the clock recovery unit 30 via an optical fiber 21, and is coupled to direct a remaining second portion of the received optical signal to a first input the phase modulator 26 via an optical fiber 23. The phase modulator 26 is also coupled to receive an electrical feedback control signal from the clock recovery unit 30 at a second input thereof. As will be described hereinafter, a phase difference between a bit stream received from the optical tap 20 via optical path 23 and the phase modulator 26 is 90 degrees. An output from the phase modulator 26 is coupled to an input of the dispersive unit 28 via an optical fiber 27. The dispersive unit 28 can comprise any suitable arrangement as, for example, a piece of optical fiber with a certain amount of dispersion, or a chirped optical fiber Bragg grating. An output of the dispersive unit 28 is provided as the output from the PMD compensation arrangement 10.

The clock recovery unit 30 can comprise any suitable clock recovery arrangement. An exemplary arrangement for the clock recovery unit 30 is shown in FIG. 1 and comprises a high-speed photodetector (PHOTO DETECTOR) 32, a clock recovery circuit (CLOCK RECOVERY) 34, a radio frequency (RF) amplifier (AMP) 36, an RF phase shifter (PHASE SHIFT) 38, and a modulator driver (DRIVER) 40. Bold solid lines between elements in FIG. 1 depict optical paths while non-bold solid lines between elements depict electrical paths.

In operation, the optical signal propagating on optical fiber 12 comprises an optical bit stream containing first and second orthogonally polarized optical pulses 14 and 15 for each bit of data which are caused by polarization mode dispersion (PMD) in the optical fiber 12. Due to the path difference that the first and second polarized optical pulses 14 and 15 (principal states of polarization) take over the optical fiber 12, a phase difference (dT) occurs between the pulses 14 and 15 when reaching the PMD compensation arrangement 10. In the PMD compensation arrangement 10, the optical tap 20 divides the received optical signal into a first portion for transmission over optical fiber 21 to an input of the clock recovery unit 30, and into a second portion for transmission over optical fiber 23 to a first input of the phase modulator 26. The phase modulator 26 receives at a second input thereof a feedback control signal generated by the clock recovery unit 30.

In the clock recovery unit 30, two polarization states are received from the optical tap 20 at the input to the photodetector 32 via optical fiber 21 for each bit of the optical data stream. The photodetector 32 cannot distinguish between the two polarization states, and generates one electrical output pulse for each bit of the data stream. The output pulse from the photodetector 32 is coupled to an input of the clock recovery circuit 34. The electrical input signal to the clock recovery circuit 34 from the photodetector 32 is a digital signal at the bit rate of the received optical signal, contains all of the data information, and covers the whole spectrum of the information. The clock recovery circuit 34 is basically a filter which filters out a signal at a predetermined frequency such as, for example, 10 GHz which corresponds to the data bit rate. The digital input signal to the clock recovery circuit 34 is used to generate a sinusoidal output clock signal at a predetermined frequency which is the bit rate of the optical signal received by the PMD compensation arrangement 10 via the optical fiber 12. The amplifier 36 amplifies the output clock signal from the clock recovery circuit 34 by a predetermined amount and delivers the amplified clock signal to the phase shifter 38. The phase shifter 38 changes, or adjusts, the phase of the sinusoidal signal by a predetermined amount to provide a correct phase information when the electrical clock feedback signal is provided to the phase modulator 26 via the phase modulator driver 40.

The phase modulator 26 receives the two polarization states 14, 15 from the optical tap 20 via the optical fiber 23. When the feedback signal from the clock recovery unit 30 is properly adjusted to have the correct phase information, there is a 90 degree phase difference between the optical signal received from the optical tap 20 and the electrical feedback signal received from the clock recovery unit 30. Since the phase modulator 26 is polarization independent, or insensitive, it does not alter in any way the received polarization states from the optical tap 20. The phase modulator 26 modulates both polarization components the same way, and both polarization states see the same amount of phase modulation. However, the sinusoidal modulation has a different slope where, for example, a left hand side has a positive slope and a right hand side has a negative slope. Therefore, it is desired to provide a delay so that the two polarization states are situated equally on the left and right hand side of center (dT/2) so that the dispersive unit will bring the two components together. The phase modulator 26 is effectively introducing a delay into the optical signal received from the optical tap 20 so that the polarization states are centered on an axis which is half way between the two peaks (dT/2) of the polarization states 14, 15. Then when the polarization states 14, 15 pass through the dispersive unit 28 the polarization components will become aligned. This compensates for the PMD in the optical signal received by the PMD compensation arrangement 10 via optical fiber 12.

It is easier to understand the temporal imaging functionality between dispersion and diffraction. Mathematically, dispersion and diffraction can be described by a same partial differential equation as is well known in the art. The only difference is that dispersion is one-dimensional, while diffraction is two-dimensional. Therefore, there exists an analogy between bulk optics, spatial imaging, dispersion, and temporal imaging. Propagation along dispersion optics corresponds to propagation in space, a phase modulation in time corresponds to an optical component with a surface profile the same as the phase profile. For example, for linear phase modulation (in time), the optical component is a prism, for positive and negative phase modulation (in time) the optical component is a positive and a negative lens, respectively, and for sinusoidal phase modulation (in time) the optical component is a grating.

Figure 2:
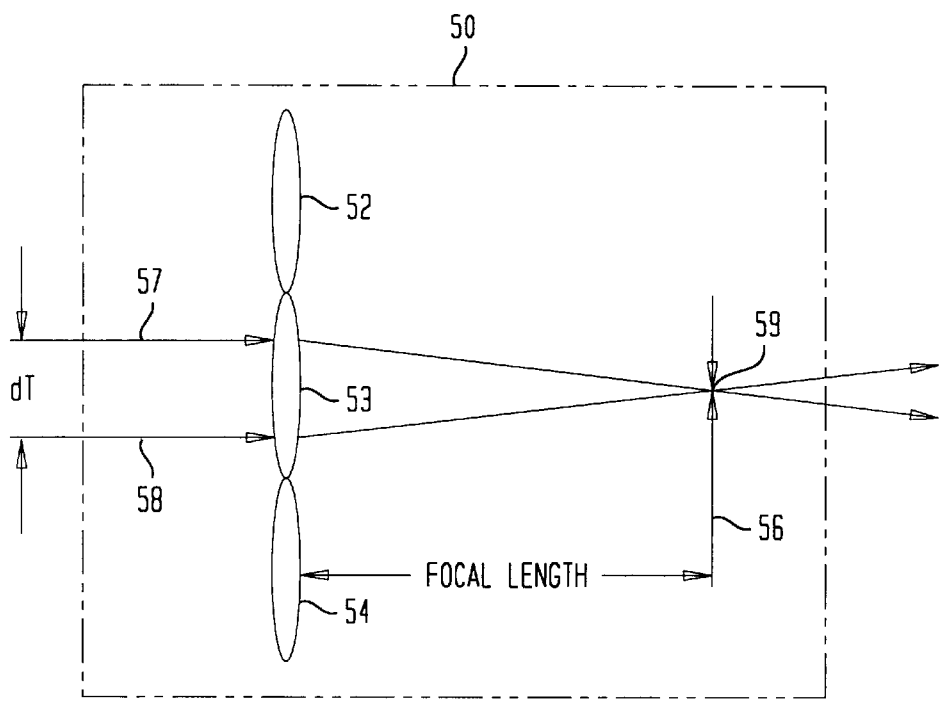
FIG. 2 shows an exemplary optical system corresponding to the functioning of the temporal imaging PMD compensation arrangement of FIG. 1.

Referring now to FIG. 2, there is shown an exemplary optical system 50 (shown within a dashed line rectangle) corresponding to, and for explaining, the functioning of the temporal imaging PMD compensation arrangement 10 of FIG. 1. The optical system 50 comprises a first, second, and third lens 52, 53, and 54 aligned in a vertical plane, and a focal plane 56 defined by the lenses 52, 53, and 54. The phase modulator 26 of FIG. 1 corresponds to the lenses 52, 53, and 54. The two polarization components (not shown), but having a differential group delay (DGD) of dT, are represented by first and second bit streams found in optical beams 57 and 58 separated by the amount dT. For purposes of illustration only, the beams 57 and 58 are shown as only impinging the lens 53. However, it is to be understood that the beams 57 and 58 can be separated by a dT that causes the beams 57 and 58 to impinge lenses 52 and 54, respectively. At the focal plane 56, the lenses 52, 53, and 54 cause the two beams 57 and 58 to be brought together with a finite spot size 59 that corresponds to a minimum pulse width. As was indicated hereinbefore, a phase difference between the bit stream and the phase modulator 26 is 90 degrees so that the center of the pulse for each bit is aligned to the center (vertical axis) of the positive lens 53. Therefore, as long as the clock feedback signal from the clock recovery unit 30 is synchronized with the bit stream, then the PMD (dT) will be compensated for without a direct PMD measurement. Such PMD compensation occurs because the polarization states are properly aligned by the phase modulator 26 and brought in phase by the dispersive unit 28. Since the phase modulator 26 is polarization insensitive, this temporal imaging technique works for any polarization and there is no need for polarization tracking.

Since PMD compensation is performed bit by bit in the time domain, it is intrinsically high-order PMD compensation. This is a very important advantage compared to other PMD compensation methods, which are first order PMD compensation techniques. For example, all first order PMD compensation techniques rely on the separation of two principal states of polarization (PSPs). This is possible only when there is first order PMD distortion. When high-order PMD exists, it is impossible to completely separate the two PSPs, which will cause system performance degradation.

There is an optimal amount of dispersion required for the dispersive unit 28 of FIG. 1 for a given phase modulation depth. Basically, the larger the phase modulation depth, the smaller the required dispersion. This feature makes it possible to optimize the design of the PMD compensation unit 10 in terms of cost and physical size by balancing the phase modulation depth and the dispersion provided in the dispersive unit 28. Phase modulation depth is defined with reference to the sinusoidal clock feedback signal provided by the clock recovery unit 30 which is amplified to a certain amplitude by the amplifier 36 therein. Changing the amplification of the amplifier 36 changes the output signal amplitude therefrom from some minus value to a plus value, or vice versa. The difference in the minus to plus peak-to-peak amplitude value is defined as the phase modulation depth. The feedback signal generated in the clock recovery unit 30, and provided to the phase modulator 26, is an electrical signal which has to be changed to correspond to the actual phase experienced by the phase modulator 26 in the optical signal from the optical tap 20 because there is a conversion from the electrical feedback signal to the optical phase modulation. The phase shifter 38 in the clock recovery unit 30 is the element that is adjusted to provide an optimal relationship between the phase depth and the amount of dispersion required in the dispersive unit 28. If an increase in the amount of phase depth is desired, then less dispersion is needed, but this requires a more powerful amplifier. Therefore, in practice it depends on which is easier and cost effective to implement that determines what values of phase depth and dispersion are provided.

As was stated hereinbefore, the phase modulator 26 receives an optical signal from the optical tap 20 comprising the two PSPs, and there is a 90 degree phase difference provided between the optical signal and the electrical feedback signal provided by the clock recovery unit 30. Since the phase modulator 26 is polarization independent, or insensitive, the phase modulator 26 modulates both polarization components the same way so that both polarization states see a same amount of phase modulation. The sinusoidal electrical feedback signal has a different slope where, for example, a left hand side has a positive slope and a right hand side has a negative slope. What is desired is to provide a delay in the phase modulator 26 so that the two polarization components are situated equally on the left hand and the right hand side of center (dT/2) so that the dispersive unit 28 will bring the two polarization components together (in phase) at the focal plane 56 of FIG. 2. In other words, the phase modulator 26 introduces a delay into the optical signal from the optical tap 20 so that the polarization components are effectively centered on a horizontal axis of the lenses 52, 53, and 54, which is half way between the two peaks (dT/2) of the two polarization components. Then when the two polarization components pass through the dispersive unit 28, the polarization components will be aligned (in phase) to provide PMD compensation.

Figure 3:
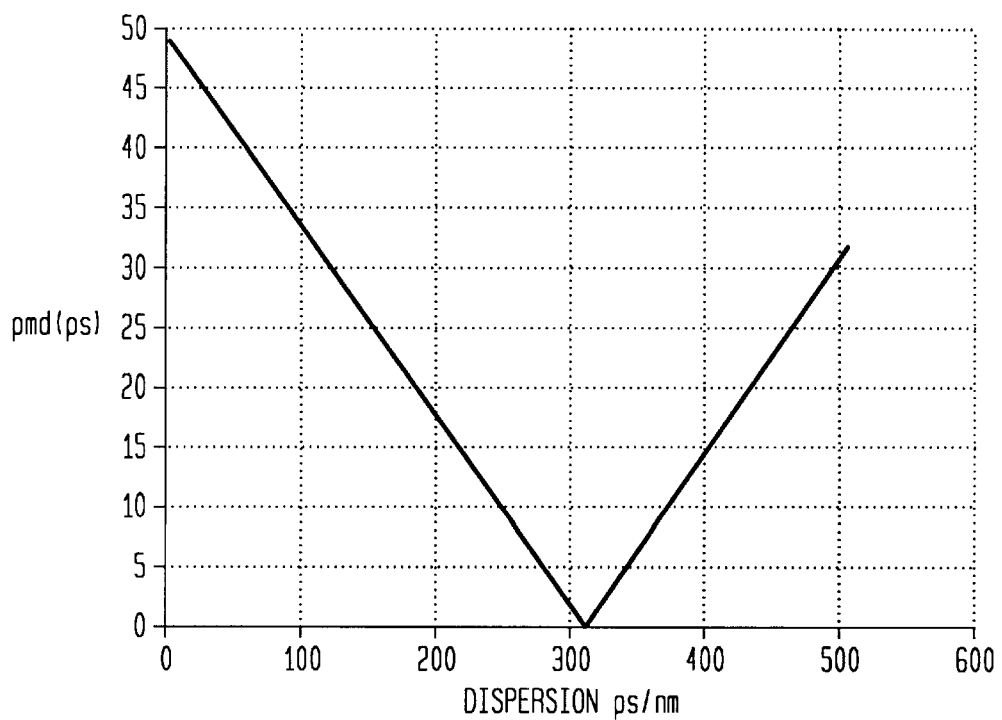
FIG. 3 graphically shows an exemplary evolution of Polarization Mode Dispersion (PMD) for providing PMD compensation.

Referring now to FIG. 3, there is graphically shown the evolution of Polarization Mode Dispersion (PMD), where the vertical axis is the PMD [or a differential group delay (DGD) corresponding to dT] in picoseconds (ps), and the horizontal axis is dispersion in picoseconds/nanometer (ps/nm). To illustrate the present PMD compensation technique, it is assumed that the initial PMD (dT) is 50 picoseconds, and the bit rate is 10 Gbit/s. The phase modulation c can be expressed by the equation $$\Phi = \Phi_0 \cos(2\pi ft), \quad (1)$$

where $\Phi_0$ is the depth of modulation, and f=10 GHz. Complete PMD compensation occurs with a dispersion of approximately 310 ps/nm, with $\Phi_0$ being 0.5 π. It is easy to understand FIG. 3 by comparing it to FIG. 2 where similar characteristic are shown. The PMD evolution shown in FIG. 3 corresponds to the propagation of the beams 57 and 58 in FIG. 2.

Figure 4:
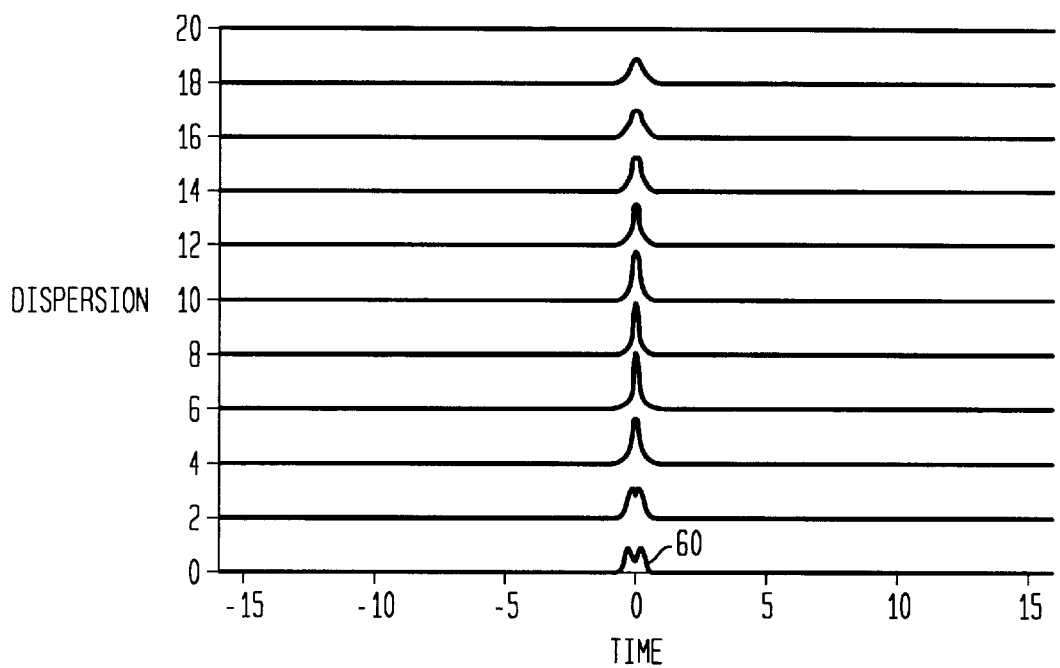
FIG. 4 graphically shows an exemplary evolution of a pulse waveform for providing PMD compensation.

Referring now to FIG. 4, there is graphically shown the evolution of a pulse waveform where the vertical axis represents an amount of dispersion (or optical fiber length if a grating is replaced by a length of optical fiber), and the horizontal axis represent time in units of bit periods. The bottom line of 0 dispersion represents a pulse waveform 60 at the input of the optical fiber length (comparable to the dispersive unit 28 of FIG. 1). As the pulse incurs a greater amount of dispersion (corresponding to propagating through the length of optical fiber), the pulse amplitude becomes two times larger than that of the input pulse at the optimum compensation point (dispersion of 8). Not only is the PMD compensated for, the system Q is improved and the pulse width is compressed by a certain amount as the two polarization states are brought in phase at the output of the dispersive unit 28 in accordance with the present invention. FIGS. 3 and 4 show the characteristic of the dynamics of one single bit, which does not reveal much about system performance such as a system Q-factor, or eye-opening.

Figure 5:
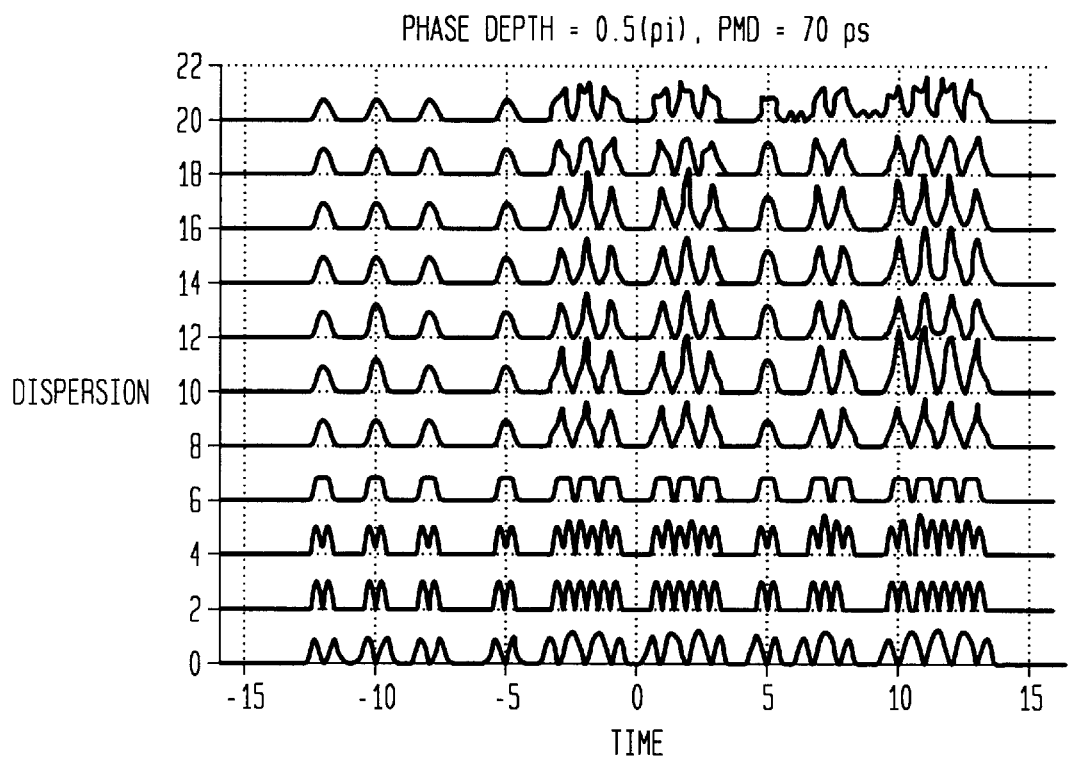
FIG. 5 graphically shows exemplary dynamics of a bitstream waveform evolution in providing PMD compensation in accordance with the present invention.

Referring now to FIG. 5, there is graphically shown the dynamics of an exemplary bit-stream waveform evolution in providing PMD compensation in accordance with the present invention. In FIG. 5 the vertical axis represents dispersion (in unit of 68 ps/nm/km), while the horizontal represents time in units of 100 ps, with the phase depth of the phase modulator 26 is 0.5 π and the initial differential group delay (DGD) is 70 ps. As shown along bottom line (0 dispersion), the waveform has been strongly distorted of PMD just before its input to the PMD compensation arrangement 10 of FIG. 1. However, after phase modulation in the phase modulator 26 and an appropriate amount of dispersion in the dispersive unit 28, the waveform recovers (as shown along the line for a dispersion of 10). At this point, the functioning of the dispersive unit 28 of FIG. 1 would be cut off, and would not introduce any further dispersion into the optical signal propagating therethrough. In other words, the dispersive unit 28 would only provide the necessary amount of dispersion necessary to provide the PMD compensation.

Figure 6:
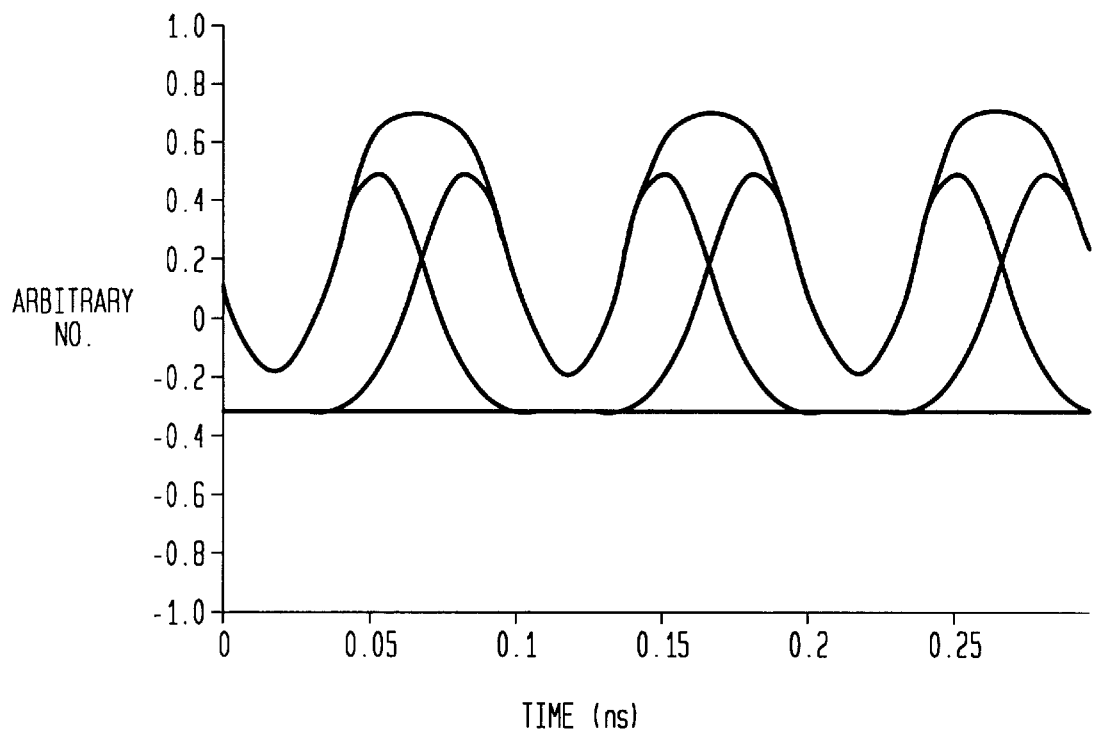
FIG. 6 graphically shows an eye diagram of an exemplary input signal to the PMD compensation arrangement 10 of FIG. 1.
Figure 7:
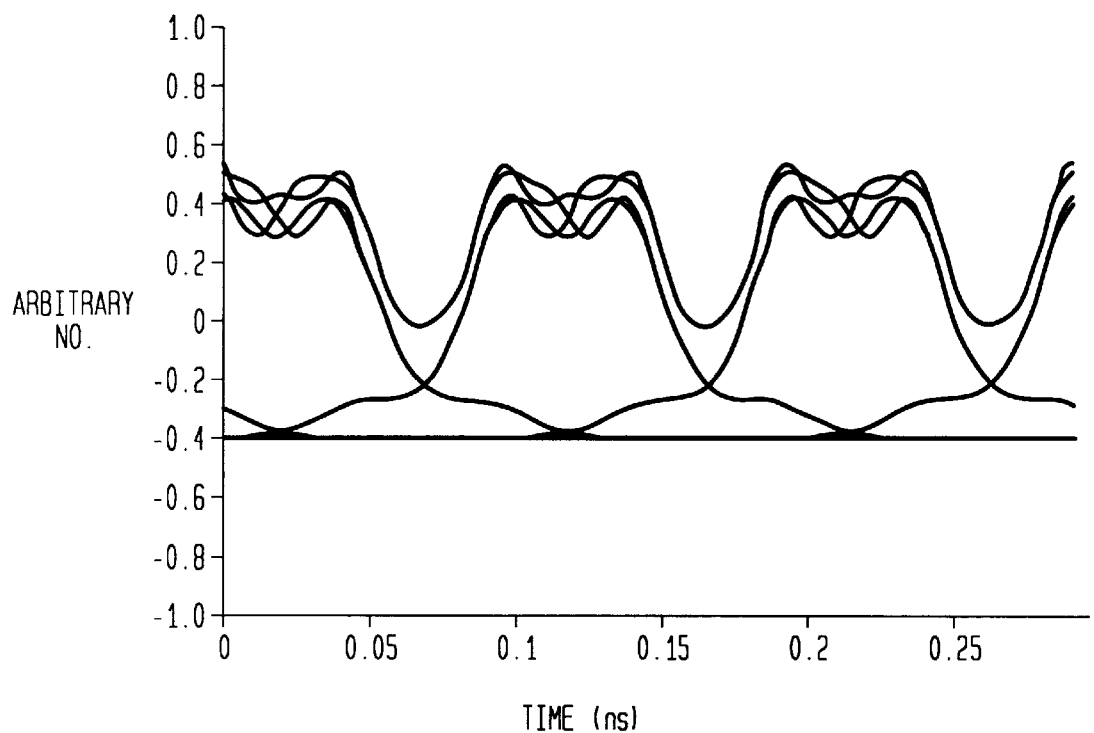
FIG. 7 graphically shows an eye-diagram of the input signal to the PMD compensation arrangement 10 of FIG. 1 for a dispersion of approximately 200 ps/nm/km.
Figure 8:
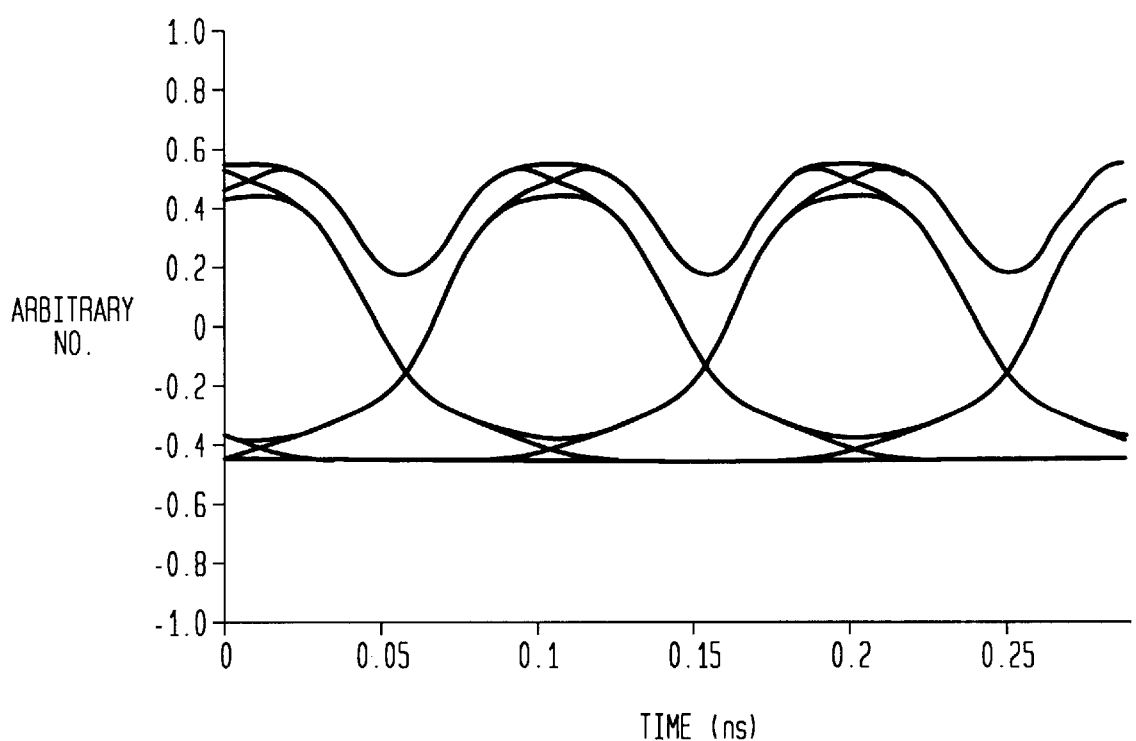
FIG. 8 graphically shows an eye-diagram of the input signal to the PMD compensation arrangement 10 of FIG. 1 once PMD compensation is completed.

Referring now to FIGS. 6, 7, and 8, FIG. 6 graphically shows an eye diagram of an exemplary input signal to the PMD compensation arrangement 10 of FIG. 1. FIG. 7 graphically shows an eye-diagram of the input signal to the PMD compensation arrangement 10 of FIG. 1 after incurring a dispersion of approximately 200 ps/nm/km. Such dispersion corresponds to the input signal (not shown) having a dispersion of 3 in FIG. 5, where each unit of dispersion on the vertical axis represents 68 ps/nm/km. FIG. 8 graphically shows an eye-diagram of the input signal to the PMD compensation arrangement 10 of FIG. 1 once PMD compensation is completed. More particularly, the eye diagrams of FIGS. 6, 7, and 8 provide eye-diagrams at the input to the dispersive unit 28, after the dispersive unit 28 has provided a predetermined amount of dispersion (200 ps/nm/km), and at the output of the dispersive unit 28, respectively. As shown in FIG. 8, the eye is fully recovered. However, due to focusing effect of the phase modulator 26 and the dispersive unit 28 of FIG. 1, the peak power at the center of the eye is much higher than the uncompensated eye. Still further, the penalty is smaller than what is shown in FIGS. 7 and 8 since only normalized eye-diagrams are shown in FIGS. 6–8. It is to be understood that similar graphs can be generated for other differential group delays (DGDs) as, for example, 80 ps to determine the amount of phase modulation and dispersion needed to provide optimum PMD compensation in accordance with the present invention.

In summary, the PMD compensation arrangement 10 provides the advantages of (1) there being no need for PMD measurements or endless polarization tracking, (2) being cost effective, compact, and no moving parts, (3) low insertion loss, (4) high compensation speed, (5) the control signal is independent of a dynamic PMD value, and (6) automatic high order PMD compensation.

It is to be appreciated and understood that the specific embodiments of the present invention described hereinbefore are merely illustrative of the general principles of the invention. Various modifications may be made by those skilled in the art which are consistent with the principles set forth.

What is claimed is:

1. A high-order polarization mode dispersion (PMD) compensation arrangement for receiving an optical input data signal comprising first and second polarization components for each bit of data that have been subjected to PMD, the PMD compensation arrangement comprising:

a clock recovery arrangement for generating an electrical clock output control signal including a predetermined phase modulation depth and phase and a data rate of the received optical input data signal;

a phase modulator responsive to the optical input data signal received by the PMD compensation arrangement and the electrical clock output control signal from the clock recovery arrangement for generating an optical output signal wherein the phase of the first and second polarization components associated with each data bit are delayed by a predetermined amount; and a dispersive unit for introducing a predetermined amount of dispersion to the first and second polarization components in the optical output signal from the phase modulator for generating an output optical signal from the PMD compensation arrangement wherein the first and second polarization components for each data bit are in phase.

2. The PMD compensation arrangement of claim 1 wherein the phase provided in the electrical clock output control signal by the clock recovery arrangement is 90 degrees from the phase of the optical input data signal received by the phase modulator.

3. The PMD compensation arrangement of claim 1 further comprising an optical tap for receiving the optical input data signal and for directing a first portion thereof to an input of the clock recovery arrangement and a second portion thereof to an input of the phase modulator.

4. The PMD compensation arrangement of claim 1 wherein the clock recovery arrangement comprises:

a photodetector for converting the optical input data signal into a corresponding electrical output signal wherein a digital pulse is provided for each bit of data in the optical input data signal;

clock recovery circuitry for receiving the electrical output signal from the photodetector and generates a clock output signal that has a frequency corresponding to the bit data rate of the optical input data signal;

an amplifier for receiving the clock output signal from the clock recovery circuitry, and for generating an amplified output signal having a predetermined amplitude that corresponds to a predetermined phase modulation depth; and a phase shifter for receiving the amplified output signal from the amplifier and introducing a predetermined phase shift therein for generating the electrical clock output control signal to the phase modulator comprising both a frequency corresponding to a bit data rate of the optical input data signal and a predetermined phase modulation depth and phase.

5. The PMD compensation arrangement of claim 1 wherein the dispersive unit comprises a predetermined length of an optical fiber comprising a predetermined amount of dispersion.

6. The PMD compensation arrangement of claim 1 wherein the dispersive unit comprises a chirped optical fiber Bragg grating.

7. The PMD compensation arrangement of claim 1 wherein PMD compensation is performed at the speed of the bit data rate of the optical input data signal received by the PMD compensation arrangement.

8. The PMD compensation arrangement of claim 1 wherein the electrical clock output control signal is independent of any PMD measurement.

9. The PMD compensation arrangement of claim 1 wherein the electrical clock output control signal is independent of any dynamic PMD value.

10. A high-order polarization mode dispersion (PMD) compensation arrangement for receiving an optical input data signal comprising first and second polarization components for each bit of data that have been subjected to polarization mode dispersion (PMD), the PMD compensation arrangement comprising:

a clock recovery arrangement for receiving the optical input data signal, and for generating therefrom an electrical clock output control signal comprising both a frequency corresponding to a bit data rate of the optical input data signal and a predetermined phase modulation depth and phase;

a phase modulator for receiving the optical input data signal, and for modulating the phase thereof in accordance with the electrical clock output control signal from the clock recovery arrangement including a phase difference of 90 degrees from that of the optical input data signal, the phase modulator generating an optical output signal wherein the phase of the first and second polarization components associated with each data bit are delayed by a predetermined amount; and a dispersive unit for introducing a predetermined amount of dispersion to the first and second polarization components in the optical output signal from the phase modulator for generating an output optical signal from the PMD compensation arrangement wherein the first and second polarization components for each data bit are in phase.

11. The PMD compensation arrangement of claim 10 further comprising an optical tap for receiving the optical input data signal and for directing a first portion thereof to an input of the clock recovery arrangement and a second portion thereof to an input of the phase modulator.

12. The PMD compensation arrangement of claim 10 wherein the clock recovery arrangement comprises:
- a photodetector for converting the optical input data signal into a corresponding electrical output signal wherein a digital pulse is provided for each bit of data in the optical input data signal;
- clock recovery circuitry for receiving the electrical output signal from the photodetector, and for generating a clock output signal that has a frequency corresponding to the bit data rate of the optical input data signal;
- an amplifier for receiving the clock output signal from the clock recovery circuitry, and for generating an amplified output signal having a predetermined amplitude corresponding to a predetermined phase modulation depth; and
- a phase shifter for receiving the amplified output signal from the amplifier and introducing a predetermined phase shift therein for generating the electrical clock output control signal to the phase modulator comprising both a frequency corresponding to a bit data rate of the optical input data signal and a predetermined phase modulation depth and phase.

13. The PMD compensation arrangement of claim 10 wherein the dispersive unit comprises a predetermined length of an optical fiber comprising a predetermined amount of dispersion.

14. The PMD compensation arrangement of claim 10 wherein the dispersive unit comprises a chirped optical fiber Bragg grating.

15. The PMD compensation arrangement of claim 10 wherein PMD compensation is performed at the speed of the bit data rate of the optical input data signal received by the PMD compensation arrangement.

16. A method of providing high-order polarization mode dispersion (PMD) compensation in an optical transmission system comprising the steps of:
(a) receiving an optical signal including first and second orthogonal principal states of polarization (PSPs) that have been subjected to polarization mode dispersion (PMD);
(b) generating an electrical clock output control signal comprising both a frequency corresponding to a bit data rate of the optical input data signal and a predetermined phase modulation depth and phase in a clock recovery arrangement from the received optical input data signal;
(c) modulating the phase of the optical input data signal received in step (a) in a phase modulator in accordance with the electrical clock output control signal generated in step (b) wherein said phase is a phase difference of 90 degrees from that of the optical input data signal, and generating an optical output signal wherein the phase of the first and second polarization components associated with each data bit are delayed by a predetermined amount; and
(d) introducing a predetermined amount of dispersion to the first and second polarization components in the optical output signal from the phase modulator by a dispersive unit for generating an output optical signal from the PMD compensation arrangement wherein the first and second polarization components for each data bit are in phase.

17. The method of claim 16 wherein in performing step (b), performing the steps of:
(b1) converting the optical input data signal into a corresponding electrical output signal in a photodetector wherein a digital pulse is generated for each bit of data in the optical input data signal;
(b2) receiving the electrical output signal from the photodetector in a clock recovery circuitry and generating a clock output signal having a frequency corresponding to the bit data rate of the optical input data signal;
(b3) receiving the clock output signal from the clock recovery circuitry in an amplifier and generating an amplified output signal having a predetermined amplitude that corresponds to a predetermined phase modulation depth; and
(b4) receiving the amplified output signal from the amplifier in a phase shifter and introducing a predetermined phase shift therein for generating the electrical clock output control signal to the phase modulator comprising both a frequency corresponding to a bit data rate of the optical input data signal and a predetermined phase modulation depth and phase.

18. The method claim 16 wherein in performing step (d), performing the step of introducing the predetermined amount of dispersion to the first and second polarization components in the optical output signal from the phase modulator by a dispersive unit comprising a predetermined length of an optical fiber including a predetermined amount of dispersion.

19. The method claim 16 wherein in performing step (d), performing the step of introducing the predetermined amount of dispersion to the first and second polarization components in the optical output signal from the phase modulator by a dispersive unit comprising a chirped optical fiber Bragg grating.

20. The method of claim 16 wherein PMD compensation is performed at the speed of the bit data rate of the received optical input data signal.

21. The method of claim 16 wherein the electrical clock output control signal generated in step (b) is independent of any PMD measurement obtainable from the received optical input data signal.

22. The method of claim 16 wherein the electrical clock output control signal generated in step (b) is independent of any dynamic PMD value in the received optical input data signal.

* * * * *